US011237015B2

(12) United States Patent
Muramatsu et al.

(10) Patent No.: US 11,237,015 B2
(45) Date of Patent: Feb. 1, 2022

(54) MAP INFORMATION TRANSMISSION DEVICE FOR TRANSMITTING OBJECTS FOR DISPLAY SUPERIMPOSED ON MAP, MAP DISPLAY DEVICE, AND METHOD (71) Applicant: KDDI CORPORATION, Tokyo (JP)

(72) Inventors: Shigeki Muramatsu, Fujimino (JP); Satoru Takagi, Tokyo (JP); Hidenori Aoki, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 93 days.

(21) Appl. No.: 16/192,340

(22) Filed: Nov. 15, 2018

(65) Prior Publication Data
US 2019/0086228 A1 Mar. 21, 2019

Related U.S. Application Data (63) Continuation of application No. PCT/JP2017/019640, filed on May 26, 2017.

(30) Foreign Application Priority Data

Jun. 6, 2016 (JP) .................................. 2016-112354

(51) Int. Cl.
*G01C 21/36* (2006.01)
*G01C 21/32* (2006.01)
(Continued)

(52) U.S. Cl.
CPC ......... *G01C 21/3682* (2013.01); *G01C 21/32* (2013.01); *G01C 21/3667* (2013.01);
(Continued)

(58) Field of Classification Search
CPC ............................ G01C 21/3682; G01C 21/32; G01C 21/3667; G09B 29/00
See application file for complete search history.

(56) References Cited

U.S. PATENT DOCUMENTS

2002/0065605 A1   5/2002  Yokota
2008/0094401 A1*  4/2008  Lee ..................... G06T 13/00
                                                          345/473
(Continued)

FOREIGN PATENT DOCUMENTS

EP    2503289 A1     9/2012
JP    2015-034847 A  2/2015
JP    2015-152708 A  8/2015

OTHER PUBLICATIONS

EPO; Application No. 17810122.6; Supplementary European Search Report dated May 10, 2019.
(Continued)

*Primary Examiner* — Thomas G Black
*Assistant Examiner* — Tarek Elarabi
(74) *Attorney, Agent, or Firm* — Fitch, Even, Tabin & Flannery LLP (57) ABSTRACT

A map information transmission device includes: a dividing unit configured to divide a region of a map into a plurality of sub regions based on superimposition positions at which a plurality of objects are to be displayed superimposed on the map, the dividing unit performing the division such that a number of objects included in each of the sub regions is a predetermined number or lower; a unit configured to generate, for each of the sub regions, a merged image that includes objects included in a sub region; a unit configured to generate, for each of the sub regions, display code that includes clipping information that designates a clipping region of the merged image that corresponds to the sub region; and a unit configured to transmit the merged image and the display code to a map display device.

9 Claims, 10 Drawing Sheets

(51) Int. Cl.
*G09B 29/00* (2006.01)
*G06T 11/60* (2006.01)
*G06F 13/00* (2006.01)
*G06F 16/29* (2019.01)

(52) U.S. Cl.
CPC ......... *G01C 21/3694* (2013.01); *G06F 13/00* (2013.01); *G06F 16/29* (2019.01); *G06T 11/60* (2013.01); *G09B 29/00* (2013.01)

(56) References Cited

U.S. PATENT DOCUMENTS

| | | | | |
|---|---|---|---|---|
| 2010/0100846 | A1* | 4/2010 | Yoshida | G01C 21/3664 |
| | | | | 715/810 |
| 2012/0306922 | A1* | 12/2012 | Kadous | G01C 21/367 |
| | | | | 345/634 |
| 2013/0191783 | A1* | 7/2013 | Sugita | G06F 3/04842 |
| | | | | 715/810 |
| 2017/0188008 | A1* | 6/2017 | Kim | G06T 7/11 |

OTHER PUBLICATIONS

Japan Patent Office, International application No. PCT/ JP 2017/ 019640, International Search Report dated Aug. 2, 2017.
EPO; Application No. 17810122.6; Intention to Grant dated Jun. 23, 2021.

* cited by examiner

```
                                    FIRST DISPLAY CODE
<?xml version="1.0" encoding="UTF-8"?>
<svg xmlns="http://www.w3.org/2000/svg" xmlns:xlink="http://www.w3.org/1999/xlink"
xmlns:go="http://purl.org/svgmap/profile"viewBox="0 0 800 800">
<metadata>
 <rdf:RDF xmlns:rdf="http://www.w3.org/1999/02/22-rdf-syntax-ns#"xmlns:crs=
 "http://opengis.org/xmldtds/transformations.dtd"xmlns:svg="http://www.w3.org/svg">
  <rdf:Description>
   <crs:CoordinateReferenceSystem rdf:resource="http://purl.org/crs/84" svg:transform=
   "matrix(100.0,0.0,0.0,-100.0,0.0,0.0)"/>
  </rdf:Description>
 </rdf:RDF>
</metadata>
<globalCoordinateSystem srsName="http://purl.org/crs/84" transform=
"matrix(100.0,0.0,0.0,-100.0,0.0,0.0)"/>
<animation xlink:href="A.svg" x="0" y="0" width="400" height="400"/>
<animation xlink:href="BA.svg" x="400" y="0" width="200" height="200"/>
<animation xlink:href="BB.svg" x="600" y="0" width="200" height="200"/>
<animation xlink:href="BCA.svg" x="600" y="200" width="100" height="100"/>
<animation xlink:href="BCB.svg" x="700" y="200" width="100" height="100"/>
<animation xlink:href="BCC.svg" x="700" y="300" width="100" height="100"/>
<animation xlink:href="BCD.svg" x="600" y="300" width="100" height="100"/>
<animation xlink:href="BD.svg" x="400" y="200" width="200" height="200"/>     S81
<animation xlink:href="CA.svg" x="400" y="400" width="200" height="200"/>     S82
<animation xlink:href="CB.svg" x="600" y="400" width="200" height="200"/>
<animation xlink:href="CCA.svg" x="600" y="600" width="100" height="100"/>
<animation xlink:href="CCB.svg" x="700" y="600" width="100" height="100"/>
<animation xlink:href="CCC.svg" x="700" y="700" width="100" height="100"/>
<animation xlink:href="CCD.svg" x="600" y="700" width="100" height="100"/>
<animation xlink:href="CDA.svg" x="400" y="600" width="100" height="100"/>
<animation xlink:href="CDB.svg" x="500" y="600" width="100" height="100"/>
<animation xlink:href="CDC.svg" x="500" y="700" width="100" height="100"/>
<animation xlink:href="CDD.svg" x="400" y="700" width="100" height="100"/>
<animation xlink:href="DA.svg" x="0" y="400" width="200" height="200"/>
<animation xlink:href="DBA.svg" x="200" y="400" width="100" height="100"/>
<animation xlink:href="DBB.svg" x="300" y="400" width="100" height="100"/>
<animation xlink:href="DBC.svg" x="300" y="500" width="100" height="100"/>
<animation xlink:href="DBD.svg" x="200" y="500" width="100" height="100"/>
<animation xlink:href="DCA.svg" x="200" y="600" width="100" height="100"/>
<animation xlink:href="DCB.svg" x="300" y="600" width="100" height="100"/>
<animation xlink:href="DCC.svg" x="300" y="700" width="100" height="100"/>
<animation xlink:href="DCD.svg" x="200" y="700" width="100" height="100"/>
<animation xlink:href="DDA.svg" x="0" y="600" width="100" height="100"/>
<animation xlink:href="DDB.svg" x="100" y="600" width="100" height="100"/>
<animation xlink:href="DDC.svg" x="100" y="700" width="100" height="100"/>
<animation xlink:href="DDD.svg" x="0" y="700" width="100" height="100"/>
</svg>
```

FIG. 9

OBJECT MERGED IMAGE

SECOND DISPLAY CODE

```
<?xml version="1.0" encoding="UTF-8"?>
<svg xmlns="http://www.w3.org/2000/svg" xmlns:xlink="http://www.w3.org/1999/xlink" viewBox="0 0 400 400" >
<globalCoordinateSystemsrsName="http://purl.org/crs/84"transform="matrix(100,0,0,0,0,0,-100,0,0,0,0,0)" />
<image preserveAspectRatio="none" xlink:href="icons.png#xywh=0,0,30,30" transform="ref(svg,300,180)" x="0" y="0" width="30" height="30"/>
<image preserveAspectRatio="none" xlink:href="icons.png#xywh=30,0,30,30" transform="ref(svg,360,360)" x="0" y="0" width="30" height="30"/>
<image preserveAspectRatio="none" xlink:href="icons.png#xywh=0,30,30,30" transform="ref(svg,240,300)" x="0" y="0" width="30" height="30"/>
<image preserveAspectRatio="none" xlink:href="icons.png#xywh=0,30,30,30" transform="ref(svg,60,50)" x="0" y="0" width="30" height="30"/>
<image preserveAspectRatio="none" xlink:href="icons.png#xywh=0,90,30,30" transform="ref(svg,130,70)" x="0" y="0" width="30" height="30"/>
<image preserveAspectRatio="none" xlink:href="icons.png#xywh=0,60,30,30" transform="ref(svg,300,70)" x="0" y="0" width="30" height="30"/>
<image preserveAspectRatio="none" xlink:href="icons.png#xywh=30,90,30,30" transform="ref(svg,70,170)" x="0" y="0" width="30" height="30"/>
<image preserveAspectRatio="none" xlink:href="icons.png#xywh=90,90,30,30" transform="ref(svg,170,170)" x="0" y="0" width="30" height="30"/>
<image preserveAspectRatio="none" xlink:href="icons.png#xywh=30,60,30,30" transform="ref(svg,90,230)" x="0" y="0" width="30" height="30"/>
<image preserveAspectRatio="none" xlink:href="icons.png#xywh=30,30,30,30" transform="ref(svg,140,250)" x="0" y="0" width="30" height="30"/>
<image preserveAspectRatio="none" xlink:href="icons.png#xywh=60,0,30,30" transform="ref(svg,20,270)" x="0" y="0" width="30" height="30"/>
<image preserveAspectRatio="none" xlink:href="icons.png#xywh=60,60,30,30" transform="ref(svg,120,340)" x="0" y="0" width="30" height="30"/>
<image preserveAspectRatio="none" xlink:href="icons.png#xywh=60,30,30,30" transform="ref(svg,120,340)" x="0" y="0" width="30" height="30"/>
</globalCoordinateSystem>
</svg>
```

MAP INFORMATION TRANSMISSION DEVICE FOR TRANSMITTING OBJECTS FOR DISPLAY SUPERIMPOSED ON MAP, MAP DISPLAY DEVICE, AND METHOD

This application is a continuation of International Patent Application No. PCT/JP2017/019640 filed on May 26, 2017, and claims priority to Japanese Patent Application No. 2016-112354 filed on Jun. 6, 2016, the entire content of both of which is incorporated herein by reference.

TECHNICAL FIELD

The present invention relates to technology for transmitting objects to be displayed superimposed on a map.

BACKGROUND ART

Various map servers are connected to wide area networks such as the Internet. Some map servers (map information transmission devices) not only transmit a map as image data, but also transmit objects that are to be displayed superimposed on the map. A terminal can receive the map and objects from the map server, and display, on a display device, an image in which the objects are superimposed on the map.

Here, the term "object" refers to an icon object (mini image) that indicates the position of a target object on the map. By viewing such a map with objects displayed superimposed thereon, a user can find out the positions of target objects represented by the objects. Examples of such objects include mini images of a gas station, a convenience store, and a bank ATM.

Japanese Patent Laid-Open No. 2015-34847 discloses a configuration for controlling the scale of a map to improve the recognition of objects from the viewpoint of the user. According to Japanese Patent Laid-Open No. 2015-34847, a map server arranges objects on a plane that corresponds to a map, divides that plane into rectangles in which the number of included objects or the data amount of the included objects is approximately the same, and stores the divided object planes. Objects can therefore be managed efficiently. Also, the map can be scale-adjusted according to the display range of the display of a terminal, and the objects of the scale-adjusted object planes can be displayed superimposed on the map.

SUMMARY OF INVENTION

Technical Problem

According to Japanese Patent Laid-Open No. 2015-34847, the terminal needs to download each of the objects from the map server. In the case of a mobile terminal such as a smartphone or a mobile telephone in particular, individually downloading objects requires repeated communication using wireless resources. Specifically, there is a problem in that the terminal transmits a request to the map server each time an object is to be downloaded, and therefore communication is performed many times. The higher the number of and type of objects to be displayed superimposed on the map is, the higher the number of communication instances also becomes.

Solution to Problem

According to an aspect of the present invention, a map information transmission device includes: a dividing unit configured to divide a region of a map into a plurality of sub regions based on superimposition positions at which a plurality of objects are to be displayed superimposed on the map, the dividing unit performing the division such that a number of objects included in each of the sub regions is a predetermined number or lower; a merged image generating unit configured to generate, for each of the sub regions, a merged image that includes objects included in a sub region; a display code generating unit configured to generate, for each of the sub regions, display code that includes clipping information that designates a clipping region of the merged image that corresponds to the sub region; and a transmitting unit configured to transmit the merged image and the display code to a map display device.

Other features and advantages of the present invention will be apparent from the following description taken in conjunction with the accompanying drawings. Note that the same reference numerals denote the same or like components throughout the accompanying drawings.

BRIEF DESCRIPTION OF DRAWINGS

FIG. 8B is a diagram showing first display code that corresponds to the object planes in FIG. 8A.

DESCRIPTION OF EMBODIMENTS

Hereinafter, embodiments of the present invention will be described in detail with reference to the drawings. Note that the following embodiments are illustrative, and the present invention is not intended to be limited to the content of these embodiments. Also, constituent elements not essential to the description of the embodiments are not shown in the drawings referenced below.

First Embodiment

Figure 1:
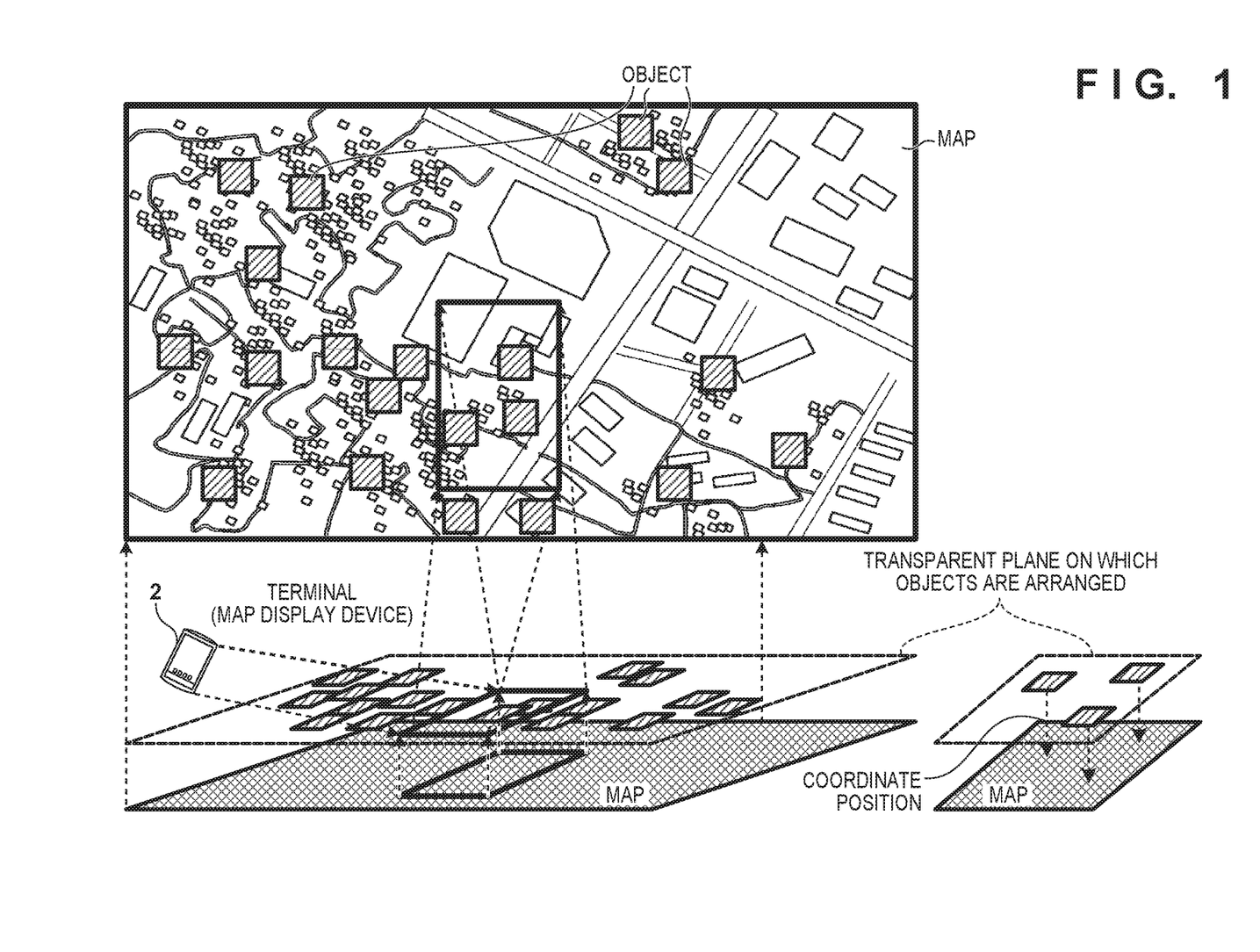
FIG. 1 is a diagram illustrating the superimposition of objects on a map.

FIG. 1 is a diagram illustrating the superimposition of objects on a map. As shown in FIG. 1, multiple objects are displayed superimposed on the map. Here, the "objects" are icon images that are to be displayed superimposed on a map.

The objects are associated with coordinates in an object plane for displaying the objects. The term "object plane" refers to the plane in which the objects are arranged. Here, it is a conceptual plane, and the objects are arranged on a transparent plane. Because portions other than the objects are transparent, the entirety of the object plane can be superimposed as-is on a map of the same size. When an object plane having the same latitude/longitude as the map is displayed superimposed thereon, the positions in the map and the positions of the objects match each other. Note that the transparent plane is not limited to being completely transparent, and may be semi-transparent (between completely transparent and completely opaque).

A terminal 2, which serves as a map display device, is a terminal such as a smart phone or a mobile phone, a tablet terminal, or a personal computer, for example. It at least includes a hardware display for displaying a map to the user. As shown in FIG. 1, the display range of the display of the terminal 2 corresponds to a partial range of the map, and objects are also displayed superimposed on the map. If the terminal 2 includes a touch panel display, a region of the map that surrounds a desired location can be displayed by a slide operation performed with the user's fingers.

Figure 2:
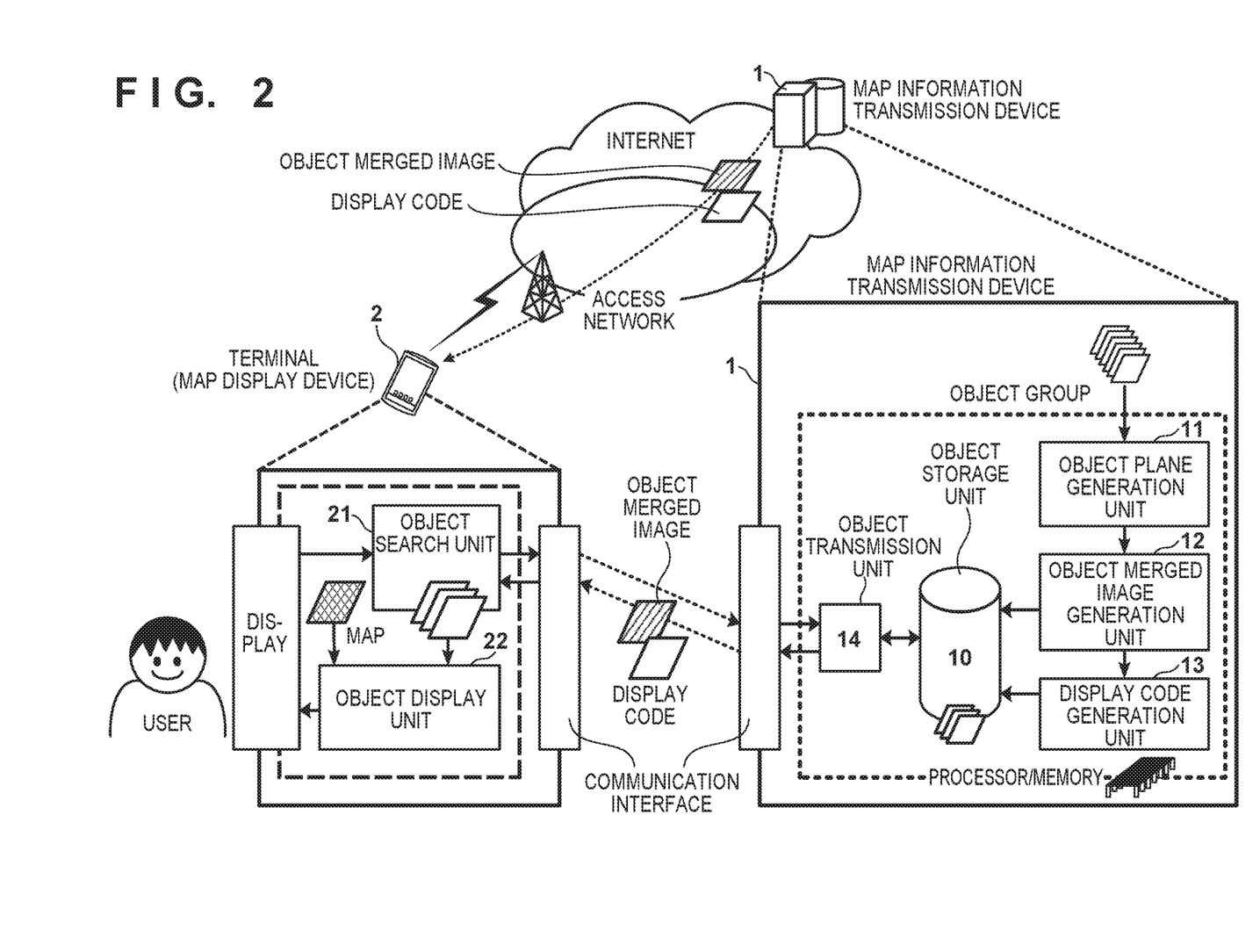
FIG. 2 is a configuration diagram of a system according to an embodiment.
Figure 3:
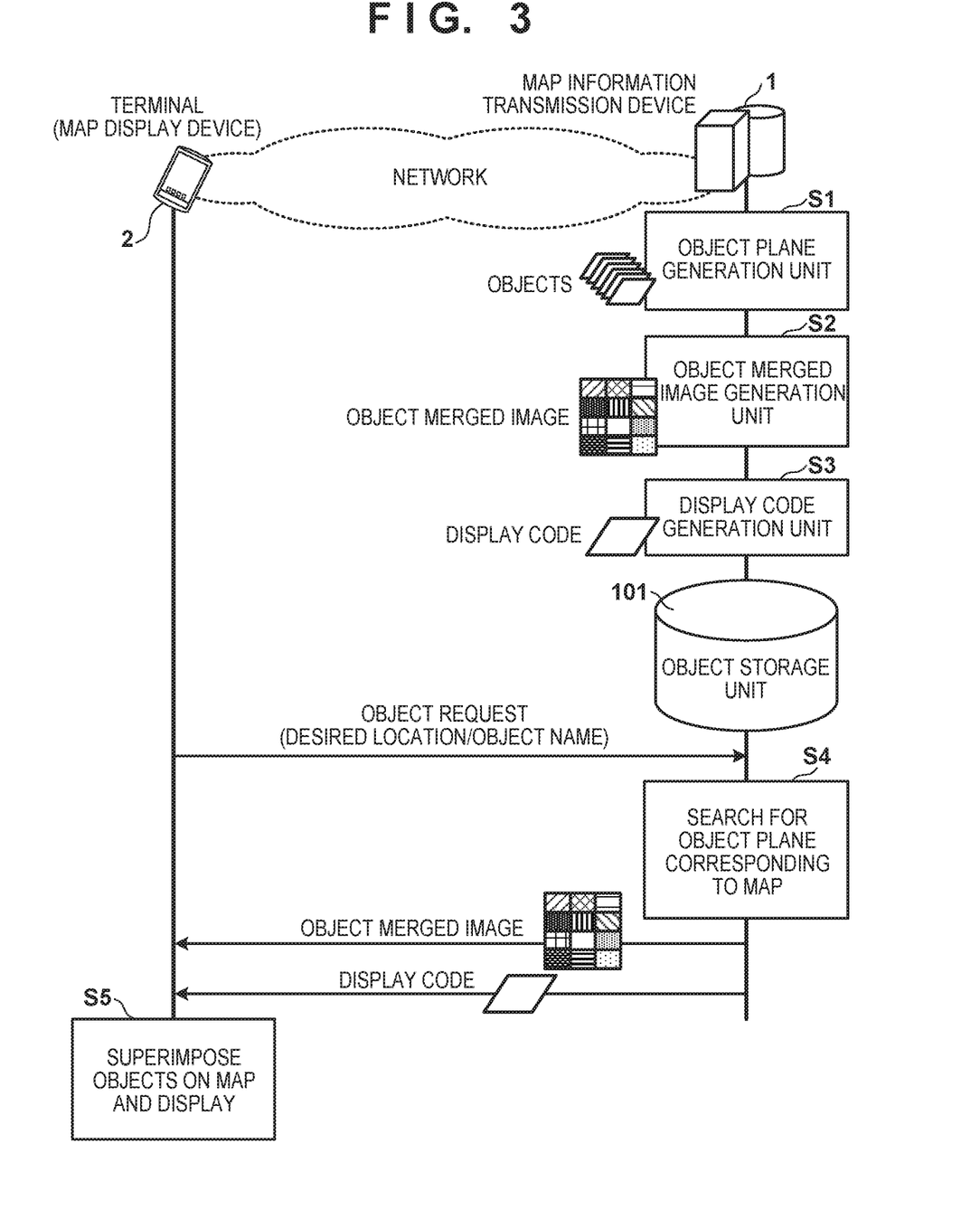
FIG. 3 is a diagram showing a sequence performed between a terminal and a map server according to an embodiment.

FIG. 2 is a function configuration diagram of the map server and the terminal in the system of the present invention. FIG. 3 is a diagram showing a sequence performed between the terminal and the map server in the present invention.

As shown in FIG. 2, a map information transmission device (map server) 1 transmits objects that are to be displayed superimposed on a map. The map information transmission device 1 of the present invention does not necessarily transmit the map to the terminal 2. If the terminal 2 already has a map stored therein, it is sufficient to download only objects from the map information transmission device 1.

Map Information Transmission Device (Map Server) 1

As shown in FIG. 2, the map information transmission device 1 has an object storage unit 10, an object plane generation unit 11, an object merged image generation unit 12, a display code generation unit 13, and an object transmission unit 14. These function configuration units can be realized by causing one or more processors included in the server to execute appropriate programs. Also, as shown in FIG. 3, the configuration can also be understood as a map information transmission method for a system that has the map information transmission device (map server) 1 that transmits objects that are to be displayed superimposed on a map, and the map display device (terminal) 2 that displays the received objects in a superimposed manner on a map. Although the following description is given with reference to the function configuration shown in FIG. 2, the flow of corresponding processing can be understood to be the same as that in the sequence shown in FIG. 3.

Object Plane Generation Unit 11 (S1)

The object plane generation unit 11 divides a whole plane that has objects arranged thereon and corresponds to a map, so as to generate rectangular object planes in each of which the number of objects is a predetermined number or lower.

Figure 4:
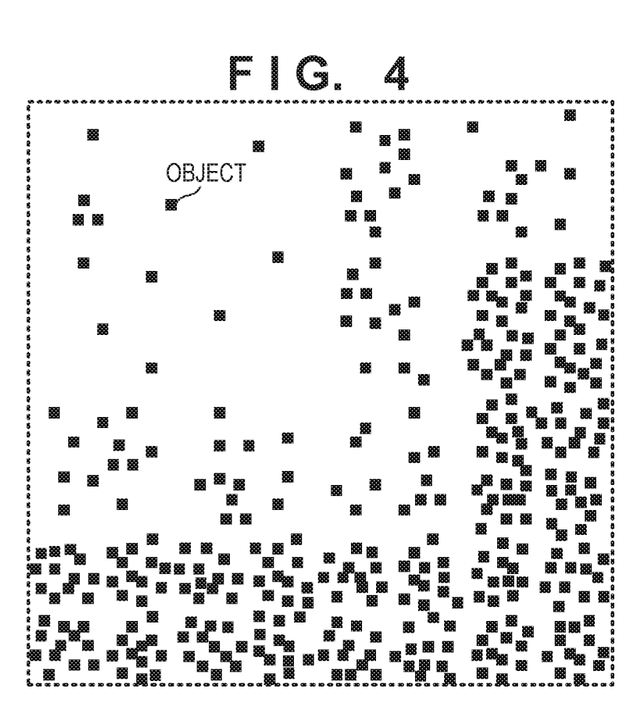
FIG. 4 is a diagram showing a whole plane that corresponds to a map and has objects arranged thereon, according to an embodiment.
Figure 5:
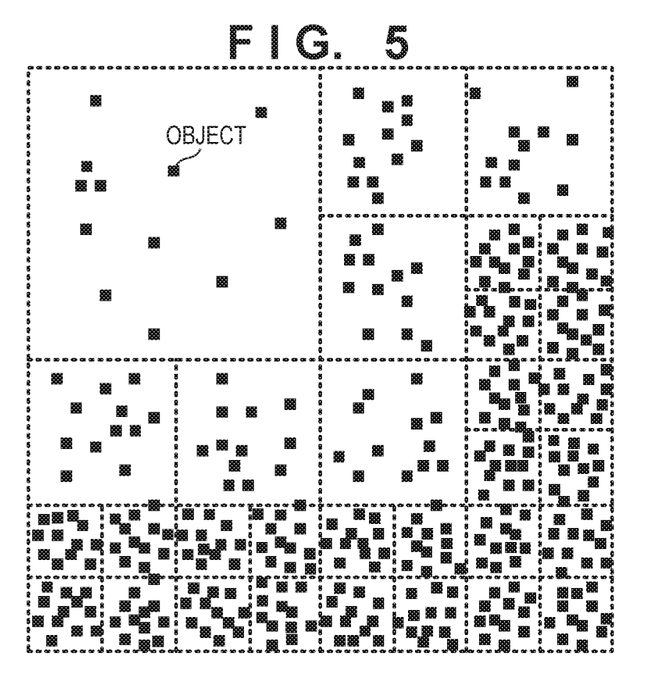
FIG. 5 is a diagram showing object planes according to an embodiment.

FIG. 4 shows a transparent whole plane that has objects arranged thereon and corresponds to a map on which the objects are to be arranged. FIG. 5 shows object planes obtained by dividing the whole plane.

As shown in FIG. 4, the distribution of objects in the map is uneven, and there are dense portions and sparse portions. According to the present embodiment, the object plane generation unit 11 divides the whole plane into rectangles such that the number of objects is a predetermined number or lower, as shown in FIG. 5. As shown in FIG. 5, there are 12 objects in each of the object planes.

One example of a division method is a method of successively dividing a region evenly into quarters until the number of objects becomes a predetermined number, as described in Japanese Patent Laid-Open No. 2015-34847. This therefore prevents the generation of a large number of divided planes that have few objects, thus making it possible to reduce the management cost of the system overall.

Figure 8A:
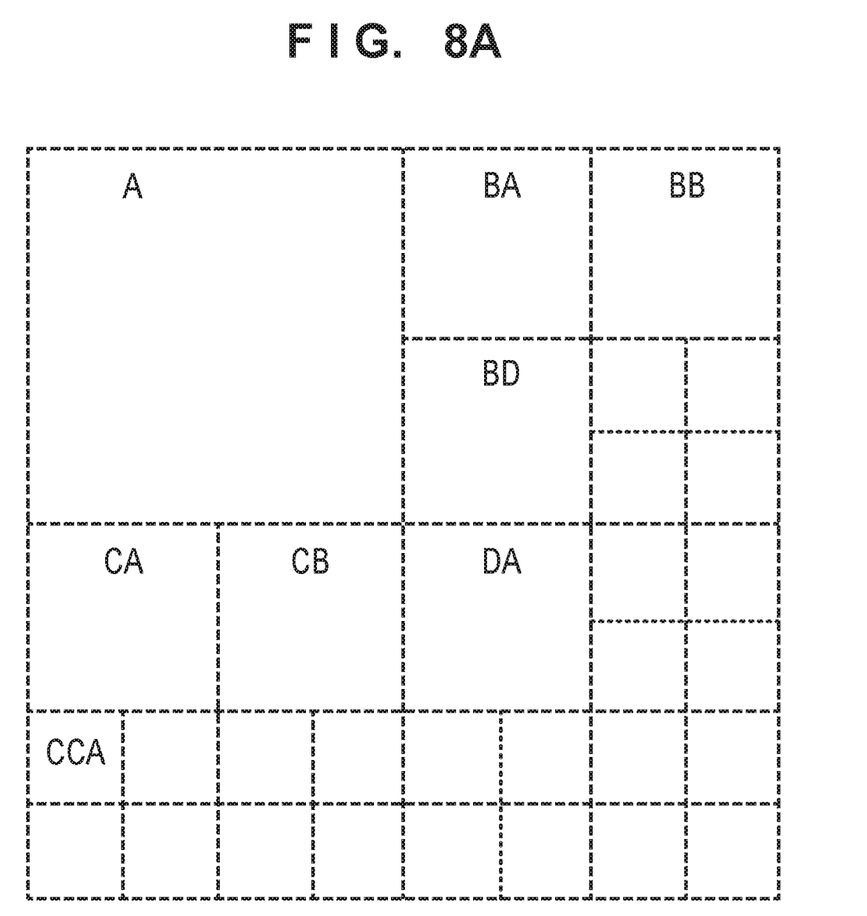
FIG. 8A is a diagram showing object planes according to an embodiment.

For example, assume that the predetermined number is set to 12. First, the one whole plane is divided evenly into quarters. Here, any plane in which the number of objects is already 12 or fewer is not divided any further. However, any plane in which the number of objects is greater than 12 is further divided evenly into quarters. By executing this processing recursively, it is ultimately possible for the number of objects to be lower than or equal to 12 and substantially the same in all of the object planes. The generated object planes can be identified by, for example, being hierarchically given labels A to D for each division into quarters as shown in FIG. 8A.

Note that due to repeatedly performing even division into quarters, the divided object planes are shaped as constant rectangular regions that can be arranged in a tiled (mesh) manner. Also, in order to be arranged in a tiled manner, the object planes are given index information (identifiers) for managing a positional relationship between planes. The index information includes at least one coordinate point (map coordinates or latitude/longitude), and a height and width based on that coordinate point at the top left. The coordinate point may be a vertex at a position other than the top left, or may be two vertices at opposite corners.

Object Merged Image Generation Unit 12 (S2)

Figure 6:
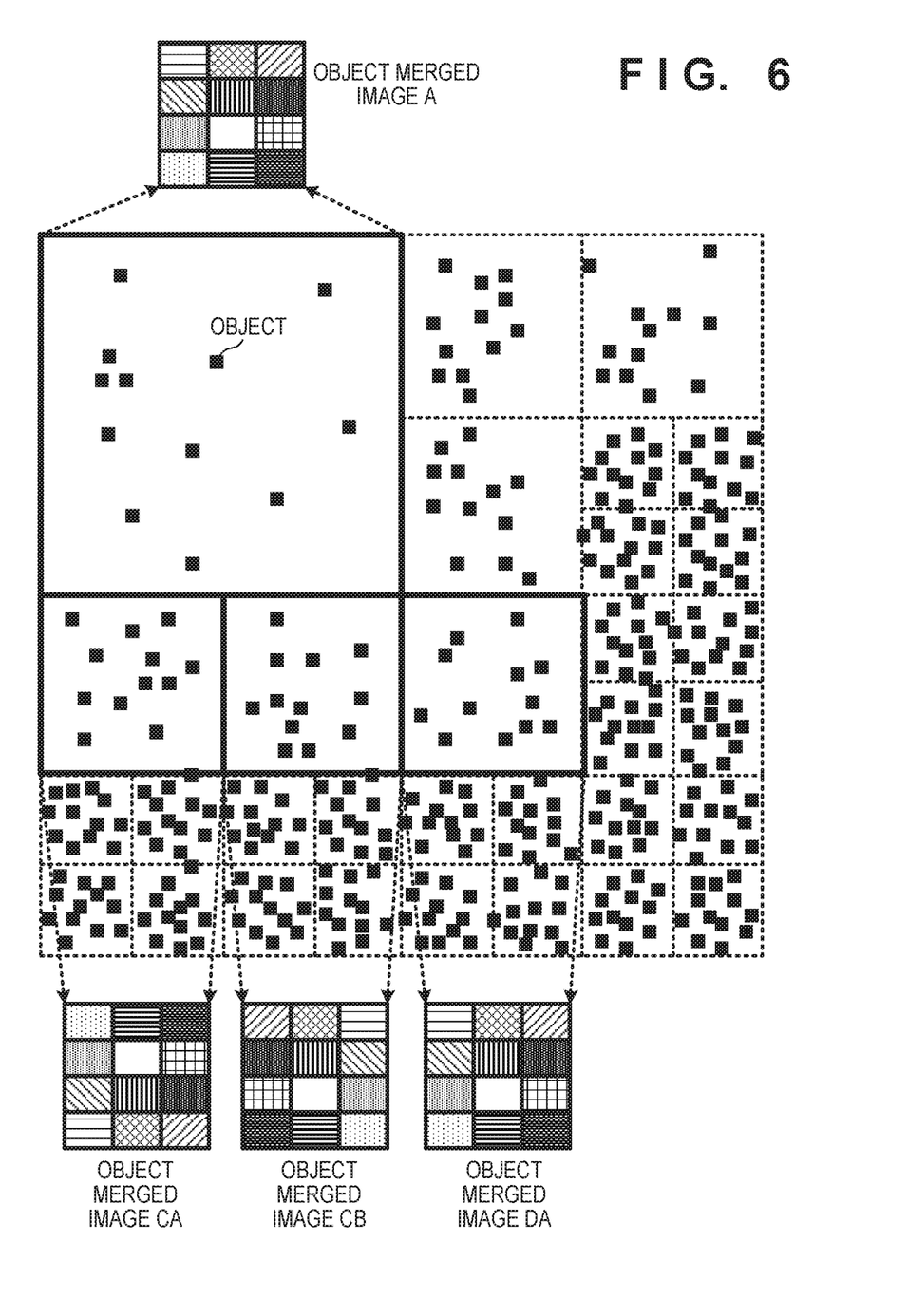
FIG. 6 is a diagram showing object merged images for respective object planes according to an embodiment.

For each object plane, the object merged image generation unit 12 generates one object merged image in which the objects therein are merged together. FIG. 6 is an illustrative diagram showing object merged images for respective object planes.

As shown in FIG. 6, in each object merged image, the objects are arranged side-by-side in a two-dimensional plane. It should be noted that the objects do not need to be arranged without gaps therebetween in the object merged image. For example, the object merged images may include blank portions. Because the object plane generation unit 11 divides the whole plane into object planes in which the number of objects does not exceed the predetermined number, there are also cases where the number of objects is lower than the predetermined number. In this case, such a portion can be left blank. Note that if the number of objects is lower than the predetermined number, it is also possible to, as desired, change the sizes of the icon objects according to the number of objects.

Here, an object merged image is generated for each of the object planes. Even if all of the objects that are to be displayed superimposed on the map are simply merged, the types of and number of objects would be very large, and a very large amount of data would need to be transmitted at a single time, and therefore this would not be efficient at all. In contrast, according to the present embodiment, an object merged image is generated for each of the object planes, and therefore it is possible to transmit only objects that need to be superimposed on a region of the map that surrounds a desired location.

Figure 7A:
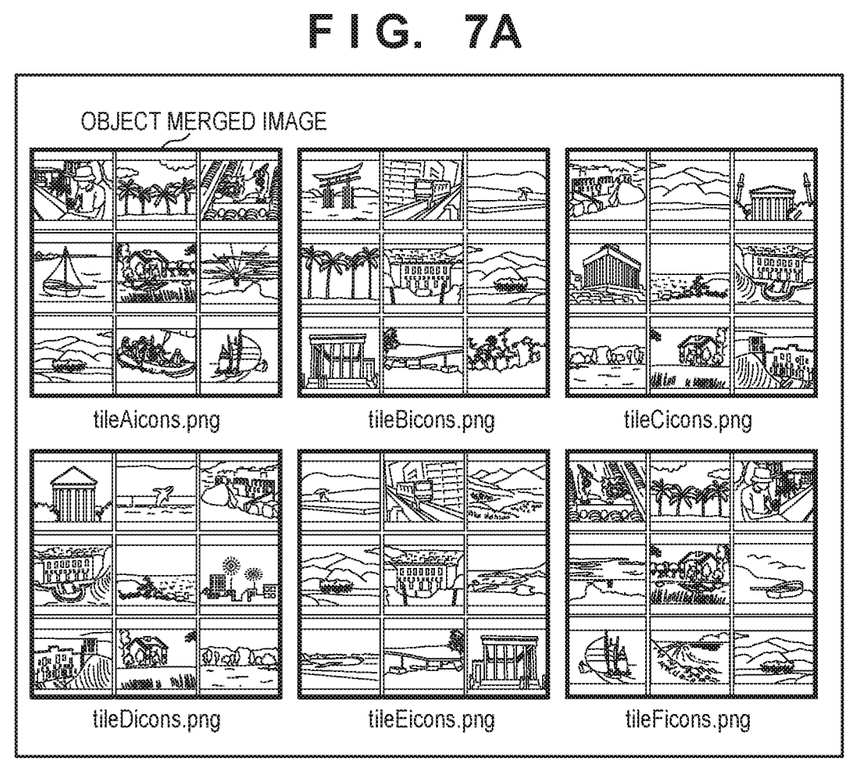
FIG. 7A is a diagram showing a specific example of object merged images according to an embodiment.

FIGS. 7A and 7B show specific examples of object merged images. In FIG. 7A, the objects included in the object merged images are various types of icons. The objects are small-sized photographs corresponding to locations on the map for example, and can be exterior photographs of buildings or the like. In this case, one set of coordinates in the object plane is associated with each object.

Figure 7B:
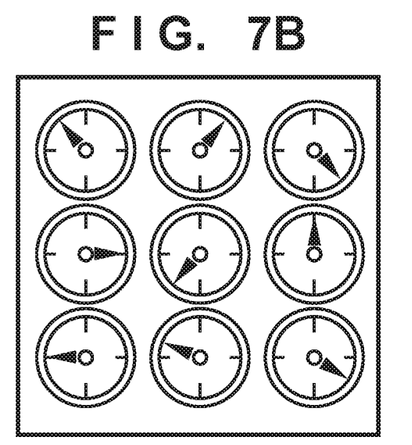
FIG. 7B is a diagram showing a specific example of object merged images according to an embodiment.

In FIG. 7B, the objects included in the object merged image are the same type of icon, but are different illustrations that are based on a predetermined condition. The objects are mini images that show wind directions for example, and are icon images that show respective directions. In this case, multiple sets of coordinates in the object plane may be associated with each object, and no coordinates whatsoever may be associated with an object. For example, a configuration is possible in which the object indicating northern wind is displayed at multiple positions in the map image, and the object indicating southern wind is not displayed anywhere in the map image. Other examples of objects include images that indicate the number of customers at a convenience store, images that indicate the number of passengers at a station, and images that indicate observed values of the temperature or signal strength.

Display Code Generation Unit 13 (S3)

The display code generation unit 13 generates first display code that manages the positional relationship of object planes, and second display code that designates clipping positions and map coordinates for the objects in each of the object planes. For example, the first display code and the second display code are defined using svg (Scalable Vector Graphics).

FIG. 8A shows object planes, and FIG. 8B shows first display code that describes the object planes in FIG. 8A.

As shown in FIG. 8B, for each object plane, the first display code designates a filename for second display code, and a region in map coordinates. Specifically, in the svg animation tag, the first display code designates the filename of second display code using the xlink:href attribute, and designates a region using the x attribute, the y attribute, the width attribute, and the height attribute. For example, reference sign S81 denotes the region of the object plane that is assigned the label "CB" in FIG. 8A (hereinafter, called the object plane CB), and the filename of second display code for the same. Specifically, it is shown that the filename of second display code corresponding to the object plane CB is "CB.svg", and that the object plane CB corresponds to a region that has the map coordinates 600,400 as the top left vertex and has a width of 200 and a height of 200. Similarly, reference sign S82 shows that the object plane CCA corresponds to a region that has a width of 100 and a height of 100 from the map coordinates 600,600, and that the filename of the corresponding second display code is "CCA.svg".

Note that it is sufficient that the first display code designates region information that indicates the regions of object planes on a map, and designates the filenames of corresponding second display code, and there is no limitation to the format shown in FIG. 8B.

Figure 9:
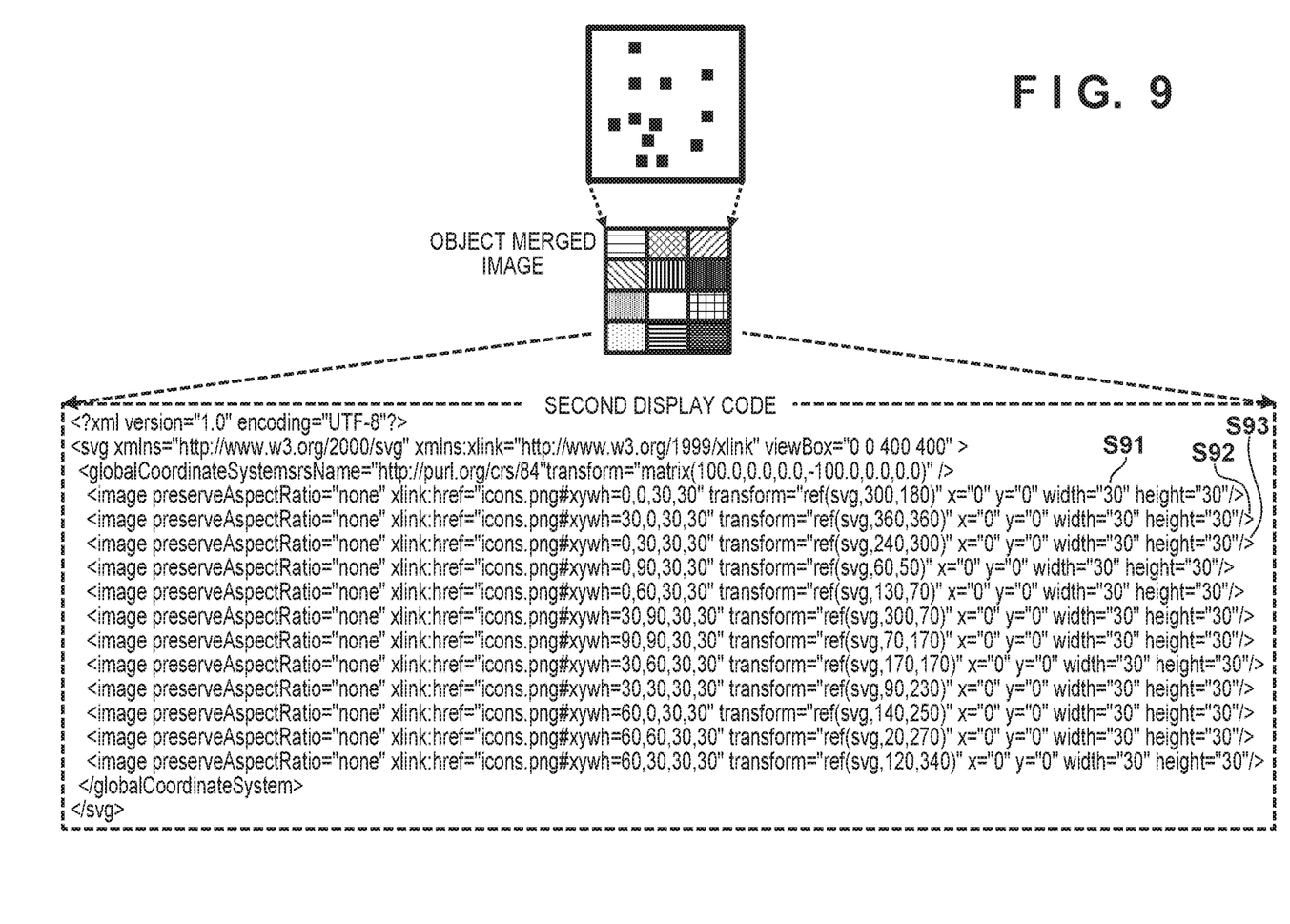
FIG. 9 is a diagram showing second display code that designates clipping positions and map coordinates for objects according to an embodiment.

FIG. 9 shows an example of second display code for one object plane. For this object plane, the second display code designates the filename of an object merged image, clipping regions in the object merged image, and map coordinates at which the respective clipping regions are to be arranged in a superimposed manner. Specifically, in the svg image tag, the filename of the object merged image and a clipping region are defined using the xlink:href attribute, and the map coordinates at which that clipping region is to be arranged in a superimposed manner are defined using the transform attribute. For example, FIG. 9 shows that the filename of the object merged image is "icons.png". Also, reference sign S91 denotes a clipping region that has the coordinate origin of the object merged image as the top left vertex (px unit), and has a width of 30 and a height of 30 from the image coordinates 0,0. Also, reference sign S91 denotes that the clipped object is to be superimposed on a region having a width of 30 and a height of 30 from the map coordinates 300,180. Similarly, reference sign S92 denotes that the clipping region has a width of 30 and a height of 30 from the image coordinates 30,0 in the object merged image "icons.png", and that the clipped object is to be displayed superimposed on a region having a width of 30 and a height of 30 from the map coordinates 360,360. Furthermore, reference sign S93 denotes that the clipping region has a width of 30 and a height of 30 from the image coordinates 0,30 in the object merged image "icons.png", and that the clipped object is to be displayed superimposed on a region having a width of 30 and a height of 30 from the map coordinates 240,300. Note that multiple map coordinates can also be designated for one object in the second display code.

Note that it is sufficient that, for a corresponding object plane, the second display code includes information indicating the filename of an object merged image, clipping information that designates a clipping region in that object merged image, and superimpose destination information that designates a range of the map in which the clipping region is to be arranged in a superimposed manner, and there is no limitation to the format shown in FIG. 9.

Object Storage Unit 10

The object storage unit 10 stores the first display code and an object merged image and second display code for each object plane.

Object Transmission Unit 14 (S4)

The object transmission unit 14 transmits object merged images and display code to the map display device 2. The object transmission unit 14 performs processing as described below, for example. First, a map acquisition request, which indicates a map to be displayed on the display, is received from the map display device 2. Here, the map acquisition request includes a user-desired display location (e.g., latitude/longitude or map coordinates). Note that it is assumed that the object storage unit 10 recognizes the correspondence relationship between object planes and latitude/longitude or map coordinates. In this case, the object transmission unit 14 uses the first display code (see FIG. 8B) to specify object planes that correspond to the display location received from the terminal 2, and determines second display code that corresponds to the specified object planes. Then, based on the determined second display code, the object transmission unit 14 transmits, to the map display device 2, an object merged image that corresponds to the specified object planes, and the second display code.

In another aspect, the first display code may be transmitted to the terminal 2 in advance. The terminal 2 can transmit, to the map information transmission device 1, the filename of second display code that was found using the first display code. In this case, the object transmission unit 14 transmits, to the terminal 2, the second display code that corresponds to the received filename, and the object merged image that is indicated in that second display code.

In yet another aspect, the map information transmission device 1 can also transmit both the first display code and second display code to the map display device 2 in advance. In this case, the object transmission unit 14 transmits only the object merged image that corresponds to a display location received from the map display device 2. This is effective in the case where the position of an object superimposed on the map does not change, but the icon image itself of that object changes from time to time. In this case, it is sufficient to transmit only the object merged image as time elapses. For example, a configuration is possible in which only the object merged image is switched depending on the date, the day of the week, the time slot, or an operation performed on the terminal by the user.

Note that although the map information transmission device 1 is shown as a single server in FIG. 2, it may be constituted by multiple servers. For example, a server that generates object merged images and display code and a server that stores object merged images and display code may be provided separately in a network.

Map Display Device (Terminal) 2

The map display device (terminal) 2 displays an object merged image received from the map information transmission device in a superimposed manner on a map. The terminal 2 has a display for displaying a map to a user, as well as an object search unit 21 and an object display unit 22. These function configuration units can be realized by causing one or more processors included in the terminal to execute appropriate programs.

Object Search Unit 21

The object search unit 21 transmits, to the map information transmission device 1, a map acquisition request that includes a user-desired display location as a query. Note that as previously described, if the terminal 2 already has the first display code stored therein, a configuration is possible in which the filename of second display code is transmitted as query to the map information transmission device 1. The object search unit 21 also outputs, to the object display unit 22, an object merged image and display code (first display code and second display code) that were received from the map information transmission device 1.

Object Display Unit 22

The object display unit 22 superimposes objects in an object merged image onto a map, and displays the resulting map on a display. Here, the object display unit 22 displays objects, which are defined by clipping positions in the object merged image, at map coordinates that are based on the display code. The term "clipping positions" refers to the positions of objects in the object merged image.

Figure 10:
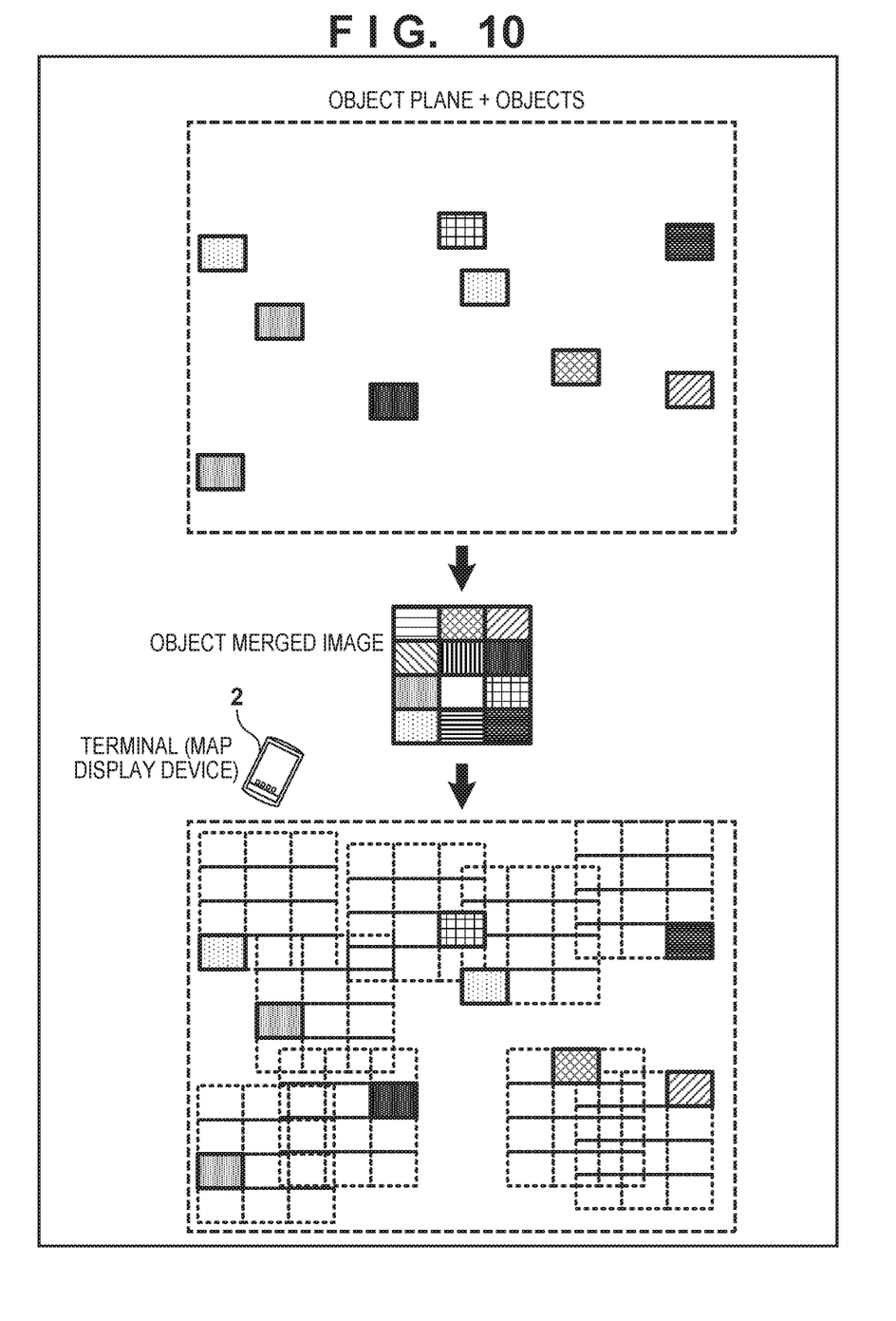
FIG. 10 is a diagram illustrating processing by which objects in an object merged image are displayed superimposed on a map, according to an embodiment.

Note that the map on which the objects are to be superimposed may be stored in advance in the map display device 2, or may be received from another map server or the map information transmission device 1. In FIG. 10, it is assumed that the map is stored in advance in the terminal 1.

FIG. 10 is a diagram illustrating the case where objects in an object merged images are displayed superimposed on a map.

If the objects are rectangular, the display range of the "clipping region" is indicated by top-left coordinates, a horizontal width, and a vertical height. Here, if the horizontal width and the vertical height are predetermined for all of the objects, the display range of an object can be known based on only the top-left coordinate point, for example. The objects in the object merged image are then arranged at corresponding map coordinates in the object plane.

As described in detail above, according to the map information transmission device, the program, and the method of the present embodiment, it is possible to minimize the number of times that communication needs to be performed when objects to be displayed superimposed on a map are downloaded from a map server by a mobile terminal.

Second Embodiment

Note that in the first embodiment, rectangular object planes are generated by dividing a whole plane into rectangles. However, the shape of the object plane is not limited to being a rectangle. For example, the shape of the object plane can be a parallelogram. In this case, division in quarters can be performed using lines that connect the midpoints of opposing sides, and the object planes can be generated using an algorithm similar to that in the first embodiment. Also, the shape of the object plane can be a triangle. In this case, division in quarters can be performed using lines that connect the midpoints of sides, and the object planes can be generated using an algorithm similar to that in the first embodiment. Furthermore, the object planes are not required to have the same shape. In one example, a whole plane is divided into small regions that each include one object, with use of a Voronoi diagram in which the positions of objects are the generators. By then combining small regions with use of a clustering technique, it is possible to generate object planes in which the number of objects is a predetermined number or lower.

Note that in the case of object planes generated in this way, the regions of the object planes can be described in the first display code by, for example, listing vertices in the clockwise direction or the counter-clockwise direction.

Similarly, in the first embodiment, the clipping regions in an object merged image are defined by top-left coordinates, a height, and a width, and therefore arrangement positions in a map are also defined by top-left coordinates, a height, and a width. In other words, the regions clipped from the object merged image are rectangles. However, the clipping regions in the object merged image can also be any type of region. In other words, for example, the clipping regions in the object merged image can each be designated by listing the coordinates of the vertices thereof (coordinate system of the object merged image). In this case, arrangement positions on a map can also be designated by listing the positions of vertices in map coordinates.

Other Embodiments

Note that although a whole plane and object planes obtained by dividing the whole plane are defined in the description of the above embodiments, these planes are for the purpose of illustration. In other words, it is sufficient that the whole plane is a region of a subject map, and that the region of the subject map is divided into sub regions based on superimposition positions of objects on the map (these sub regions correspond to the object planes of the above embodiments). Note that the region is divided such that the number of objects included in each sub region is a predetermined number or lower.

In the various embodiments of the present invention described above, a person skilled in the art could easily make various changes, improvements, and omissions within the scope of the technical idea and gist of the present invention. The description given above is merely one example, and is not intended to be limiting in any way. The present invention is limited by only the scope of the claims and content defined as equivalent thereof.

The present invention is not limited to the above embodiments, and various changes and modifications can be made within the spirit and scope of the present invention. Therefore, to apprise the public of the scope of the present invention, the following claims are made.

The invention claimed is:

1. A map information transmission device connected to a network comprising:
   one or more processors configured to perform:
   dividing a region of a map into a plurality of sub regions based on superimposition positions at which a plurality of objects are to be displayed superimposed on the map, the dividing being performed such that a number of objects included in each of the plurality of sub regions is a predetermined number or lower;
   generating, for each of the plurality of sub regions, a single merged image for a sub region, wherein the single merged image for a first sub region of the plurality of sub regions includes objects to be superimposed on the first sub region;
   generating, for each of the plurality of sub regions included in the single merged image for the first sub region, display code that includes clipping information and superimpose destination information, wherein the clipping information of the display code for the first sub region designates first areas on the single merged image for the first sub region, each of the first areas corresponding to each of the objects included in the single merged image for the first sub region, and wherein the superimpose destination information of the display code for the first sub region designates second areas on the map, onto which each of the first areas corresponding to each object included in the single merged image for the first sub region is to be superimposed; and
   transmitting, via the network, the single merged image and the display code for the first sub region to a map display device in response to receiving a position in the first sub region from the map display device,
   wherein the first areas and the second areas are different.

2. The map information transmission device according to claim 1, wherein the single merged image for the first sub region is an image in which the objects to be superimposed on the first sub region are arranged side-by-side in a two-dimensional plane.

3. The map information transmission device according to claim 1, wherein the clipping information is designated using an xlink:href attribute in an svg image tag, and the superimpose destination information is designated using an svg transform attribute.

4. The map information transmission device according to claim 1, wherein the one or more processors are further configured to perform, for each of the plurality of sub regions, generating other display code that indicates information indicating the display code and indicates a range of the map that corresponds to the sub region.

5. The map information transmission device according to claim 4, wherein the range of the map is designated using an xlink:href attribute in an svg animation tag.

6. The map information transmission device according to claim 1,
   wherein each of the plurality of object is an icon that can be displayed superimposed on the map, and
   the objects included in the single merged image are different types of icon images, or a same type of icon images but have different illustrations based on different conditions.

7. A non-transitory computer readable medium including program instructions that cause a computer to function as the map information transmission device according to claim 1.

8. A map display device that communicates with a map information transmission device via a network, comprising:
   a display; and
   one or more processors configured to perform:
   transmitting, via the network, information indicating a position in a map to the map information transmission device;
   receiving, from the map information transmission device, a single merged image and display code including clipping information and superimpose destination information for a sub region in the map, wherein the sub region corresponds to the position in the map transmitted to the map information transmission device, the single merged image includes a plurality of objects to be superimposed on the sub region, the clipping information designates first areas on the single merged image for the sub region, each of the first areas corresponding to each of the objects included in the single merged image for the sub region, and the superimpose destination information for the sub region designates second areas on the map, onto which each of the first areas corresponding to each object included in the single merged image for the sub region is to be superimposed;
   clipping each of the first areas corresponding to each of the objects included in the single merged image for the sub region based on the clipping information; and
   displaying, on the display, each of the first areas corresponding to each of the objects clipped from the single merged image in a superimposed manner on the map based on the superimpose destination information,
   wherein the first areas and the second areas are different.

9. A method performed by a map server connected to a network for transmitting an object to be displayed superimposed on a map, the method comprising:
   dividing a region of the map into a plurality of sub regions based on superimposition positions at which a plurality of objects are to be displayed superimposed on the map, the dividing being performed such that a number of objects included in each of the plurality of sub regions is a predetermined number or lower;
   generating, for each of the plurality of sub regions, a single merged image for a sub region, wherein the single merged image for a first sub region of the plurality of sub regions includes objects to be superimposed on the first sub region;
   generating, for each of the plurality of sub regions included in the single merged image for the first sub region, display code that includes clipping information and superimpose destination information, wherein the clipping information of the display code for the first sub region designates first areas on the single merged image for the first sub region, each of the first areas corresponding to each of the objects included in the single merged image for the first sub region, and wherein the superimpose destination information of the display code for the first sub region designates second areas on the map, onto which each of the first areas corresponding to each object included in the single merged image for the first sub region is to be superimposed; and
   transmitting, via the network, the single merged image and the display code for the first sub region to a map display device in response to receiving a position in the first sub region from the map display device,
   wherein the first areas and the second areas are different.

* * * * *